(12) United States Patent
Kurose et al.

(10) Patent No.: US 7,787,061 B2
(45) Date of Patent: Aug. 31, 2010

(54) RECEIVING APPARATUS

(75) Inventors: Takahiro Kurose, Daito (JP); Toshihiro Takagi, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 987 days.

(21) Appl. No.: 11/455,677

(22) Filed: Jun. 20, 2006

(65) Prior Publication Data

US 2007/0006259 A1    Jan. 4, 2007

(30) Foreign Application Priority Data

Jun. 20, 2005    (JP)    ............................. 2005-179446

(51) Int. Cl.
*H04N 5/50*    (2006.01)
(52) U.S. Cl. ...................................................... 348/731
(58) Field of Classification Search ................ 348/731, 348/732, 725, 726, 728; 455/182.3, 192.2, 455/192.3
See application file for complete search history.

(56) References Cited

U.S. PATENT DOCUMENTS

| 6,992,728 | B2 * | 1/2006 | Takagi et al. ................. 348/569 |
| 7,206,032 | B2 * | 4/2007 | Shibusawa .................. 348/732 |
| 7,221,411 | B2 * | 5/2007 | Tani et al. ................... 348/731 |
| 7,375,771 | B2 * | 5/2008 | Naoi et al. .................. 348/732 |
| 2007/0006258 | A1 * | 1/2007 | Kurose et al. ................ 725/38 |

FOREIGN PATENT DOCUMENTS

| JP | 2002-354353 | 12/2002 |
| JP | 2004-186975 | 7/2004 |

\* cited by examiner

*Primary Examiner*—Paulos M Natnael
(74) *Attorney, Agent, or Firm*—Pillsbury Winthrop Shaw Pittman, LLP (57) ABSTRACT

When, for any channel registered in a channel table, a detecting means detects that no program is being broadcast, a broadcast suspension setting means turns on a flag associated with that channel that indicates broadcast suspension. Also, a tuning reception prohibiting means prohibits a tuning receiving means from receiving tuning of a channel whose associated flag that indicates broadcast suspension is turned on.

4 Claims, 10 Drawing Sheets

9A: ALL-CHANNEL TABLE

| PHYSICAL CHANNEL | VIRTUAL CHANNEL | SUB-CHANNEL |
|---|---|---|
| 1 | 25 | 1 |
| | | 2 |
| 2 | 31 | — |
| 4 | 18 | 1 |
| | | 2 |
| | 45 | 1 |
| ⋮ | ⋮ | ⋮ |
| 98 | 88 | 1 |
| | | 2 |
| 101 | 91 | 1 |
| | | 2 |
| 103 | 100 | 1 |
| | | 2 |

FIG.3

9B: FAVORITE CHANNEL TABLE

| PHYSICAL CHANNEL | VIRTUAL CHANNEL | SUB-CHANNEL | BROADCAST SUSPENSION FLAG |
|---|---|---|---|
| 1 | 25 | 1 | OFF |
| 2 | 31 | — | OFF |
| 8 | 39 | 2 | ON |
| 13 | 55 | 1 | OFF |
| ⋮ | ⋮ | ⋮ | ⋮ |
| 76 | 43 | 2 | ON |
| 95 | 106 | 2 | OFF |
| 103 | 135 | 1 | OFF |

RECEIVING APPARATUS

CROSS REFERENCE

This Nonprovisional application claims priority under 35 U.S.C. §119(a) on Patent Application No. 2005-179446 filed in Japan on Jun. 20, 2005, the entire contents of which are hereby incorporated by reference.

BACKGROUND OF THE INVENTION

The present invention relates to a receiving apparatus that receives a digital broadcast signal that is being broadcast on a tuned channel.

In digital broadcasting, as is publicly known, broadcasting can be performed by a stream in which data for a plurality of programs is multiplexed. That is, it is possible to broadcast a plurality of programs on one physical channel. Here, one physical channel means a channel that corresponds to a frequency band of a carrier wave used for program broadcast. With a digital broadcast, because a plurality of programs may be broadcast on one physical channel, it is necessary to decide the channel on which each program is broadcast. Thus, one or a plurality of virtual channels are assigned to a physical channel. Also, by assigning sub-channels, a virtual channel can be used as a plurality of channels that broadcast a program. For example, if a physical channel to which two virtual channel numbers "10" and "11" has been assigned, when broadcasting two programs, by using "10" as the channel number where one of the programs is being broadcast and using "11" as the channel number where the other program is being broadcast, it is possible to decide the channel on which each program is being broadcast. Also, if a physical channel to which one virtual channel number "20" has been assigned, when broadcasting two programs, by using sub-channel numbers "1" and "2", and using "20-1" as the channel number where one of the programs is being broadcast and using "20-2" as the channel number where the other program is being broadcast, it is possible to decide the channel on which each program is being broadcast. A user tunes a channel with a virtual channel or a virtual channel plus sub-channel.

Also, the digital broadcast receiving apparatus, at an appropriate time, detects whether or not each receivable physical channel is a channel on which a program is being broadcast, and performs a channel search in which, for each physical channel on which a program is being broadcast, for each program being broadcast on that physical channel, the virtual channels or the virtual channel plus sub-channel being used for program broadcast is registered in an all-channel table. The receiving apparatus, prevents tuning of a channel on which a program is not being broadcast by switching the channel (the virtual channel, or the virtual channel plus sub-channel) based on the all-channel table registration contents when a channel up/down operation has been performed by the user.

On the other hand, with a digital broadcast, as disclosed in JP 2002-354353A and JP 2004-186975A, the number of programs being broadcast on a physical channel changes dynamically. Thus, circumstances arise in which after the previous channel search, a channel on which program broadcast has been stopped (i.e., a channel on which a program is not being broadcast) is tuned, or in which after the previous channel search, a channel on which program broadcast has begun cannot be tuned. Accordingly, in the conventional technology, the all-channel table is updated by performing a channel search when the apparatus main body is powered on or the like.

Also, in JP 2002-354353A, it is proposed to detect the channel configuration of a physical channel on which a program being received is being broadcast, and when there has been a change in the channel configuration, to output an OSD image that indicates that fact. The channel configuration is the configuration of virtual channels or virtual plus sub-channels being used for program broadcast in that physical channel. Also, in JP2004-186975A, it is proposed to, when there is a difference in the channels on which a program is being broadcast detected by a channel search and the channels on which a program is being broadcast detected by a previous channel search, inform the user of this difference, and have the user perform an operation to update the all-channel table.

Also, with a digital broadcast, because a plurality of programs can be broadcast on one physical channel, the total number of programs being broadcast is large, and operations to tune the program that the user will view is troublesome. Accordingly, it is conceived to provide a favorite channel table, in which the user registers a channel (a virtual channel or a virtual channel plus sub-channel) on which a program they like is being broadcast, and when a channel up/down operation is performed by the user, switch channels based on the registered content of the favorite channel table, not the all-channel table.

However, when a configuration is adopted in which when it has been detected that a program is not being broadcast on a channel that is registered in the favorite channel table, this channel is deleted from the favorite channel table, a channel that the user registered in the favorite channel table is deleted from the favorite channel table without the user's knowledge. In this case, when the user checks the registered content of the favorite channel table, the user notices that the channel they registered is not registered in the favorite channel table. As a result, there is the problem that the user is made to feel uneasy that the receiving apparatus main body may be broken, confusing the user. Also, when the program broadcast stoppage on the channel deleted from the favorite channel table is temporary, there is the problem that it is necessary for the user to again perform the operation that registers the deleted channel in the favorite channel table, increasing the burden on the user, so operability is poor.

Also, when a configuration is adopted in which when it has been detected that a program is not being broadcast on a channel that is registered in the favorite channel table, this channel is not deleted from the favorite channel table, when the user tunes this channel, video and audio are not output. At this time, there is the problem that the user erroneously thinks that they made a mistake in the registration operation of the channel to the favorite channel table, and as a result the user is confused.

SUMMARY OF THE INVENTION

It is an object of the present invention to provide a receiving apparatus in which, using a channel table in which a user registers a channel that is broadcasting a program they like, operability for user channel tuning is improved, and the user is not confused.

The receiving apparatus of the present invention is provided with a registering means that registers a channel for which registration has been designated in a channel table. This receiving apparatus is also provided with a tuning receiving means that receives tuning of only a channel that is registered in the channel table, and a receiving means that receives a digital broadcast signal of the channel received by the tuning receiving means. This receiving apparatus is also provided with a detecting means that detects whether or not a program is being broadcast for each channel, and a broadcast suspension setting means that, when a channel for which it has been detected by the detecting means that a program is not being broadcast is a channel that is registered in the channel table, turns on a flag that indicates broadcast suspension and that is associated with the channel, and a tuning reception prohibiting means that, for a channel that is registered in the channel table and for which the associated flag that indicates broadcast suspension is turned on, prohibits reception of tuning by the tuning receiving means.

The channel designated for registration by the user is registered in the channel table by the registering means. This channel table is distinguished from the all-channel table, and is referred to as the favorite channel table. The tuning receiving means receives tuning of only channels that are registered in the channel table. Accordingly, the user can tune a channel to watch from the channels that are registered in the channel table.

Also, when, for any channel registered in a channel table, the detecting means detects that no program is being broadcast, the broadcast suspension setting means turns on a flag associated with the channel that indicates broadcast suspension. Further, the tuning reception prohibiting means prohibits the tuning receiving means from receiving tuning for the channel whose flag indicating broadcast suspension is turned on. That is, even if the channel is registered in the channel table, when detecting that a program is not being broadcast on that channel, tuning of that channel is not received. Thus, it is possible to prevent the user from erroneously thinking that a mistake was made in the operation registering that channel in the channel table and becoming confused.

Also, the receiving apparatus may additionally include a broadcast suspension releasing means that, when the detecting means has detected that a program is being broadcast on a channel that is registered in the channel table and whose associated flag indicating broadcast suspension is turned on, turns off the flag indicating broadcast suspension associated with that channel.

In this case, when it has been detected that a program is being broadcast on a channel whose associated flag indicating broadcast suspension is turned on, the flag is automatically turned off by the broadcast suspension releasing means. Accordingly, even in the case of a channel whose flag was turned on because broadcast of a program was temporarily suspended, the flag is turned off when broadcast of the program resumes, and so it becomes possible to tune that channel.

Furthermore, because a channel that the user registered in the channel table is not freely deleted from the channel table, operability is not reduced.

Also, by having the detecting means detect, at a time that has been set in advance, whether or not a program is being broadcast for each channel that is registered in the channel table, it is possible to prevent a situation in which a channel on which a program is not being broadcast is tuned and a channel on which a program is being broadcast cannot be tuned.

Further, the tuning reception prohibiting means may by replaced by an OSD image outputting means that outputs an OSD image that, when a registered in the channel table and whose associated flag indicating broadcast suspension is turned on, informs that a program is not presently being broadcast. In this case, when a channel for which the flag is turned on has been tuned, an OSD image is output that informs that a program is not presently being broadcast, so it is possible to prevent the user from erroneously thinking that a mistake was made in the operation registering that channel in the channel table and becoming confused.

DESCRIPTION OF THE INVENTION

Figure 1:
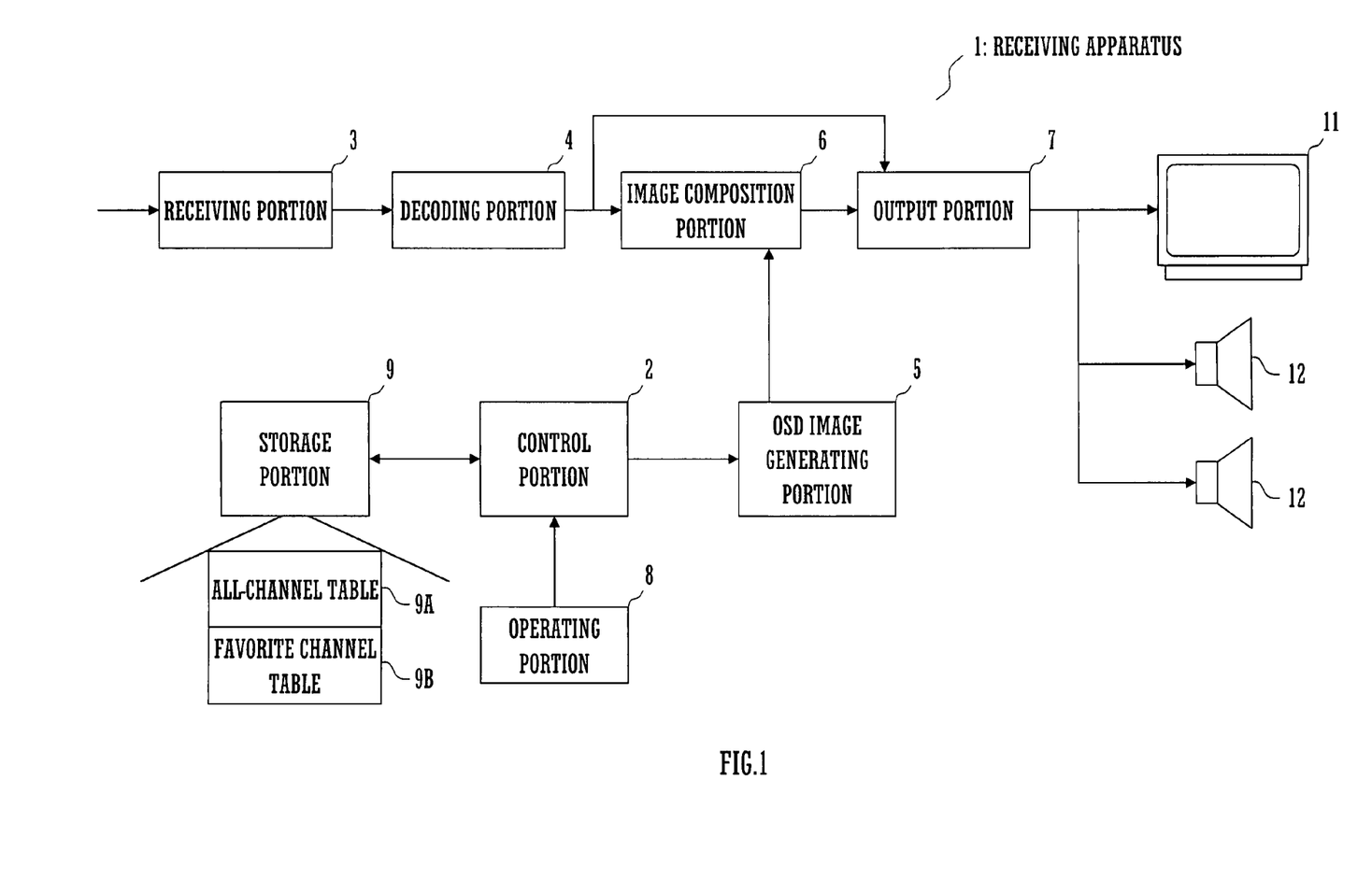
FIG. 1 is a block diagram that shows the configuration of the main portions of a receiving apparatus that is an embodiment of this invention.

FIG. 1 is a block diagram that shows the configuration of the main portions of a receiving apparatus that is an embodiment of the present invention. A receiving apparatus 1 of this embodiment is provided with a control portion 2 that controls the operation of the apparatus main body, a receiving portion 3 that receives a digital broadcast signal and extracts a stream of a physical channel that corresponds to a channel that is tuned (a channel tuned using a virtual channel or a virtual channel plus sub-channel), a decoding portion 4 that extracts and decodes video data and audio data of the channel that is tuned from the stream extracted by the receiving portion 3, an OSD image generating portion 5 that generates an OSD image, an image composition portion 6 that generates a composite image in which an OSD image generated by the OSD image generating portion 5 is superimposed, an output portion 7 that outputs a video signal and an audio signal, an operating portion 8 that receives input operation of the apparatus main body, and a storage portion 9 that stores an all-channel table 9A and a favorite channel table 9B, described below.

Here, a digital broadcast channel number is simply described. There are three elements in a digital broadcast channel number: a physical channel, a virtual channel, and a sub-channel. The physical channel corresponds to the frequency range of a carrier wave used for a program broadcast. With a digital broadcast, a plurality of programs can be broadcast on one physical channel. Accordingly, when a plurality of programs are being broadcast on one physical channel, virtual channels and sub-channels are used such that individual programs can be tuned. A virtual channel is a channel number that has been associated with a physical channel, and it is possible to assign one or a plurality of virtual channels to one physical channel. A sub-channel is used supplementally when one virtual channel is used as a plurality of channels. For example, in the case of a virtual channel "10", by using sub-channels "1" and "2", the virtual channel can be used as two channels "10-1" and "10-2".

When a virtual channel is used as a channel on which one program is broadcast, there may be instances when sub-channels are not used for this virtual channel.

The receiving portion 3 receives a physical channel that corresponds to a channel that is tuned using a virtual channel or a virtual channel plus sub-channel, and extracts a stream of a program being broadcast on this physical channel. In the stream that is received and extracted by the receiving portion 3, video data and audio data of all of the programs being broadcast on the tuned physical channel (the physical channel that corresponds to the channel that is tuned using a virtual channel or a virtual channel plus sub-channel) is multiplexed. In the receiving portion 3, an antenna that receives a digital broadcast is connected, but this is not shown in the figures. The decoding portion 4, from the stream extracted by the receiving portion 3, extracts video data and audio data of the channel that is tuned using a virtual channel or a virtual channel plus sub-channel, and decodes the video data and the audio data extracted here. The OSD image generating portion 5, as necessary, generates an OSD image such as the channel number that is tuned or a menu screen. The image composition portion 6 generates a composite image in which an OSD image generated by the OSD image generating portion is superimposed on video of the video data decoded by the decoding portion 4, and outputs video data of this composite image. The image composition portion 6, when a superimposed OSD image is not generated by the OSD image generating portion 5, outputs the video data input from the decoding portion 4. The video data output from the image composition portion 6 is input to the output portion 7. Also, the audio data decoded by the decoding portion 4 is output to the output portion 7. The output portion 7 generates a video signal based on the video data input from the image composition portion 6, and inputs this to a display apparatus 11. In the display apparatus 11, video based on the video signal input from the output portion 7, i.e., video of the program being broadcast on the channel that is tuned, is displayed. Also the output portion 7 inputs an audio signal based on the audio data input from the decoding portion 4 to a speaker 12. With the speaker 12, audio based on the audio signal input from the output portion 7, i.e., audio of the program being broadcast on the channel that is tuned, is output. The output portion 7 synchronizes the video signal input to the display apparatus 11 and the audio signal input to the speaker 12.

Figure 2:
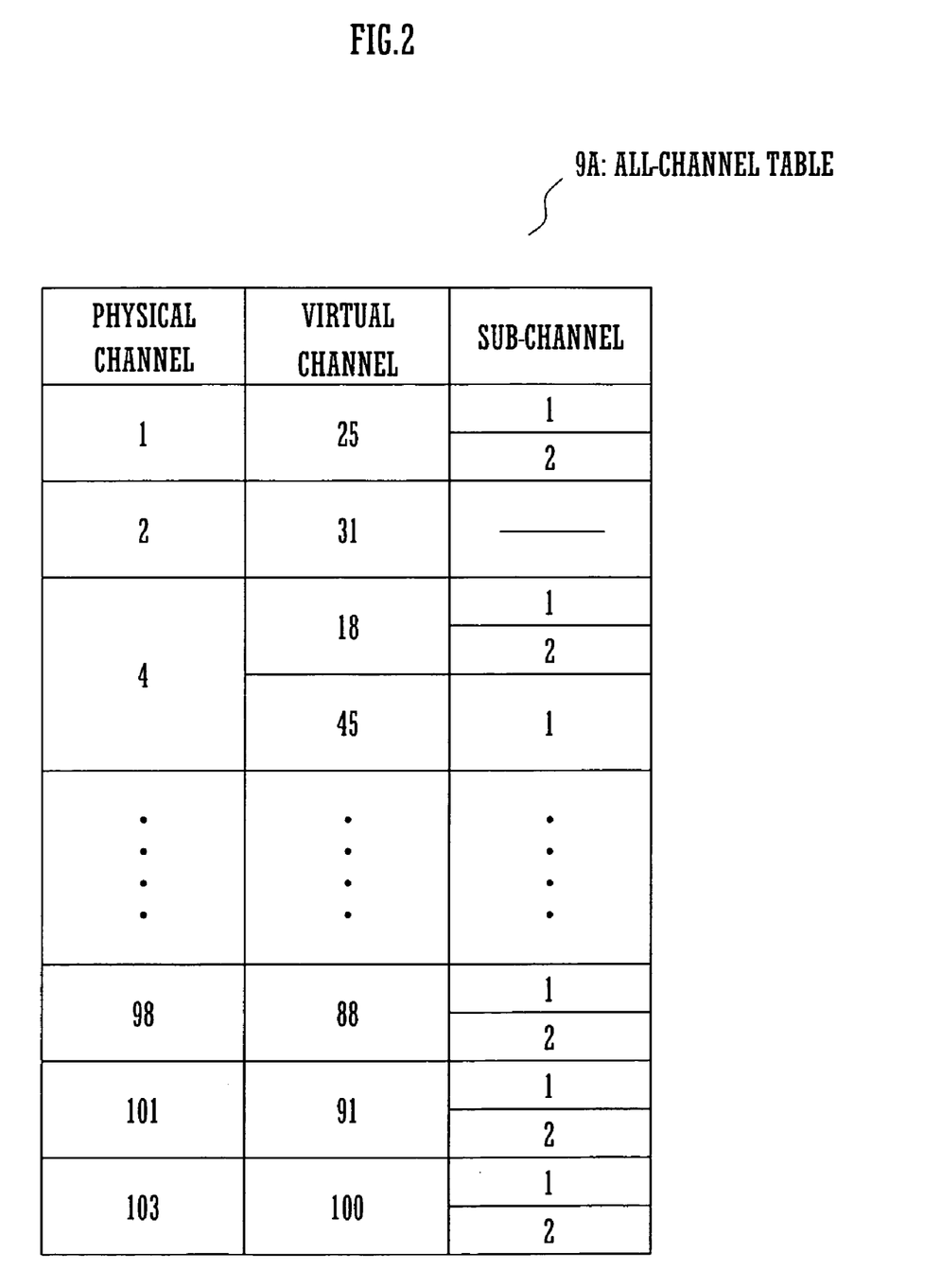
FIG. 2 shows an all-channel table of a receiving apparatus that is an embodiment of this invention.

The operating portion 8 includes a plurality of operating keys that perform an input operation for the apparatus main body, and a receiving portion that receives a control command for the apparatus main body transmitted from a remote control apparatus not shown in the figures. The receiving apparatus 1, when an operating key is operated, or when a control command for the apparatus main body transmitted from the remote control apparatus is received, judges that there was input to the apparatus main body. The control portion 2 of the receiving apparatus 1 controls operation of the apparatus main body according to input to the apparatus main body received by the operating portion 8. The storage portion 9 stores the all-channel table 9A and the favorite channel table 9B. The favorite channel table 9B corresponds to the channel table referred to in this invention. The storage portion 9 is configured with a nonvolatile memory. FIG. 2 shows the all-channel table 9A. In the all-channel table 9A, virtual channels and sub-channels are associated with each physical channel that is registered. The all-channel table 9A is a table in which all of the physical channels on which a program is being broadcast are registered. However, because detection of changes in the physical channels on which a program is being broadcast is difficult to perform in real time, there are instances when the registered content of the all-channel table and the configuration of each physical channel on which a program is being broadcast at that point in time are temporarily not in agreement. For example, at a time decided in advance such as when the power of the apparatus main body is off, the receiving apparatus 1 detects the channel configuration (virtual channels and sub-channels) for each physical channel on which a program is being broadcast, and performs processing that updates the registered content of the all-channel table 9A, or when the received physical channels were changed, detects the channel configuration for the changed physical channels, and performs processing that updates the corresponding channel registration content of the all-channel table 9A.

Figure 3:
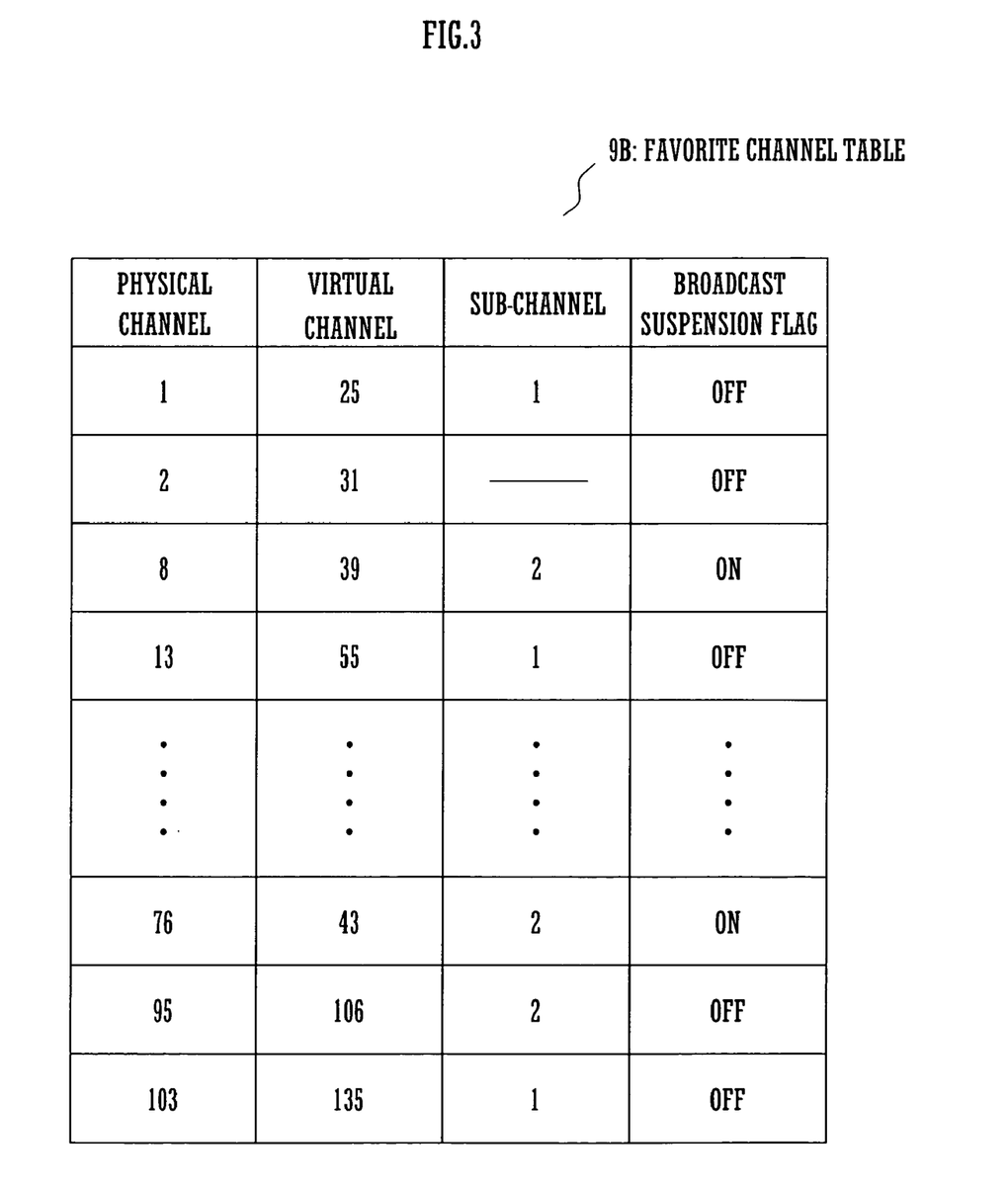
FIG. 3 shows a favorite channel table of a receiving apparatus that is an embodiment of this invention.

FIG. 3 shows a favorite channel table. In the all-channel table 9B, channels are registered with the units with which the channels are tuned. As shown in FIG. 3, physical channels and virtual channels (or virtual channels plus sub-channels) are associated. Tuning is performed using a virtual channel or a virtual channel plus sub-channel. Also, a virtual channel with which a sub-channel is not associated is a virtual channel in which a sub-channel is not used. By performing a predetermined input operation to the apparatus main body, the user can newly register a channel to the favorite channel table 9B or delete a channel from the favorite channel table 9B. Further, in the favorite channel table 9B, associated with each registered channel is a broadcast suspension flag that indicates whether or not a program is being broadcast on that channel. A channel whose broadcast suspension flag is turned on is a channel on which a program is not being broadcast, and a channel whose broadcast suspension flag is turned off is a channel on which a program is being broadcast.

Figure 4:
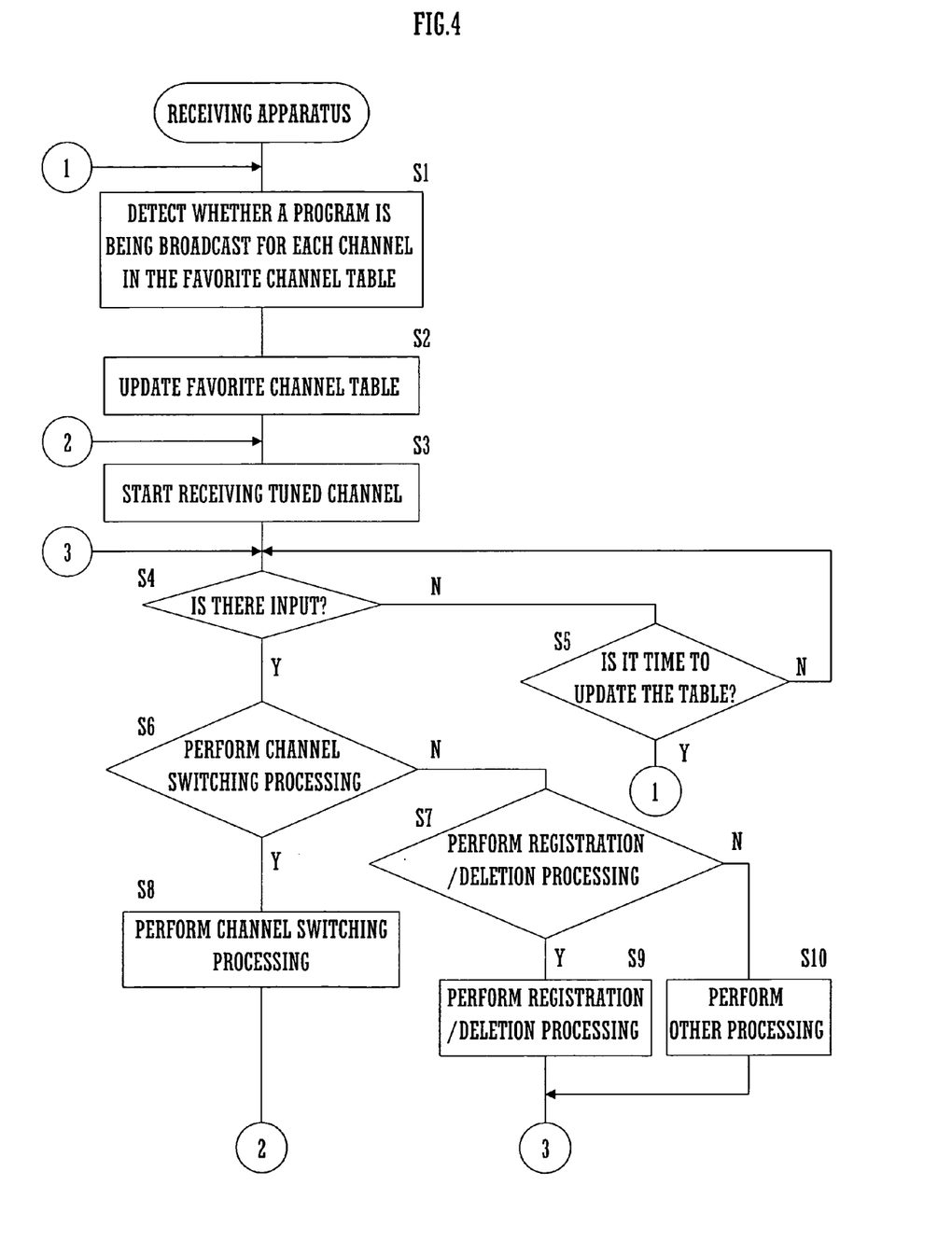
FIG. 4 is a flowchart that shows the operation of a receiving apparatus that is an embodiment of this invention.

Following is a description of the operation of the receiving apparatus 1, which is an embodiment of this invention. FIG. 4 is a flowchart that shows the operation of a receiving apparatus that is an embodiment of this invention. When power for the apparatus main body is turned on, the receiving apparatus 1 starts the processing shown in FIG. 4, and when power for the apparatus main body is turned off, the receiving apparatus 1 ends this processing. When power for the apparatus main body is turned on, the receiving apparatus 1 first detects whether or not a program is being broadcast for each channel registered in the favorite channel table 9B (S1). In S1, for each channel that is registered in the favorite channel table 9B, by receiving the corresponding physical channel with the receiving portion 3, and processing the reception signal of this physical channel, the receiving apparatus 1 detects whether or not a program is being broadcast on this channel. The receiving apparatus 1 performs processing to update the favorite channel table 9B (S2) that turns off the broadcast suspension flag associated with a channel for which it has been detected in S1 that a program is being broadcast, and turns on the broadcast suspension flag associated with a channel for which it has been detected that a program is not being broadcast.

In this manner, when the power for the main body has been turned on, the receiving apparatus 1 detects whether or not a program is being broadcast at that point in time for each channel that is registered in the favorite channel table 9B, and performs processing that registers those results in the favorite channel table 9B.

When the processing in S2 is completed, the receiving apparatus 1 starts reception of the program being broadcast by the tuned channel (when power is on, the channel that was tuned when the receiving apparatus 1 was previously turned off) (S3). The tuned channel referred to here is the channel tuned with a virtual channel or a virtual channel plus subchannel. In S3, the receiving portion 3 starts reception of the digital broadcast signal of the physical channel that corresponds to the tuned channel. The receiving portion 3 outputs a stream of the physical channel that is being received. The decoding portion 4 extracts video data and audio data of the program being broadcast on the tuned channel from the stream output from the receiving portion 3, and starts processing that decodes that data. The image compositing portion 6 starts processing that generates video data of a composite image in which an OSD image generated by the OSD image generating portion 5 is superimposed on video of the video data that has been decoded by the decoding portion 4. When OSD images have not been generated by the OSD image generating portion 5, the image compositing portion 6 outputs the video data that has been decoded by the decoding portion 4. The output portion 7 outputs a video signal based on the video data output from the image compositing portion 6, and starts processing that outputs an audio signal based on the audio data that has been decoded by the decoding portion 4. Thus, video of the program being broadcast on the tuned channel is displayed in the display apparatus 11, and audio of this program is output from the speaker 12.

When a program is not being broadcast on the tuned channel, a configuration may be adopted in which an OSD image that informs that a program is not being broadcast is displayed in the display apparatus 11, and a configuration may be adopted in which an appropriate channel on which a program is being broadcast is tuned and the processing in S3 is performed.

When the receiving apparatus 1 starts receiving the channel tuned in S3, the receiving apparatus 1 judges whether there is an input to the apparatus main body (S4), and judges whether a fixed amount of time, for example one hour, has passed since the previous update of the favorite channel table 9B (S5). When the receiving apparatus 1 judges in S5 that the fixed amount of time has passed, it returns to S1 and repeats the processing described above. In the receiving apparatus 1, the last time that the favorite channel table 9B was updated is stored in a memory (not shown) provided in the control portion 2, and a timer (not shown) that clocks the present time is provided. When the difference between the time clocked by this timer and the stored last time that the favorite channel table 9B was updated is more than the fixed amount of time, the receiving apparatus 1 judges that the fixed amount of time has passed since the previous update of the favorite channel table 9B. In this way, the receiving apparatus 1, periodically, detects whether or not a program is being broadcast for each channel that is registered in the favorite channel table 9B, and updates the state of the broadcast suspension flag.

Also, here, in S5 the receiving apparatus 1 judges whether or not a fixed amount of time has passed, but because a program broadcast is usually started at a time with an even cutoff such as on the hour, the judgment in S5 may be replaced with processing that judges whether or not the time is on the hour. Further, when the processing in S1 and S2 is performed, because reception of the channel tuned at that point in time is temporarily suspended, a configuration may be adopted in which, for example, the channels that are registered in the favorite channel table 9B are divided into two groups, and the processing in above S1 and S2 is performed alternately for the channels in one group and the channels in the other group. If such a configuration is adopted, it is possible to suppress the amount of time that reception of the tuned channel is suspended, so it is possible to suppress the sense of discomfort imparted to the user who is viewing the program that is being broadcast on the channel tuned at that point in time.

The user performs a desired input operation of the receiving apparatus 1 by operating an operating key provided in the operating portion 8 or a remote control apparatus (not shown). When there is an input to the apparatus main body, the receiving apparatus 1 judges whether the current input is a request for channel switching using the favorite channel table 9B, and whether the current input is a request for processing to register/delete a channel to the favorite channel table 9B (S6, S7). When it is judged in S6 that the current input is a request for channel switching using the favorite channel table 9B, the receiving apparatus 1 performs channel switching processing using the favorite channel table 9B shown in the FIG. 5 (S8).

Figure 5:
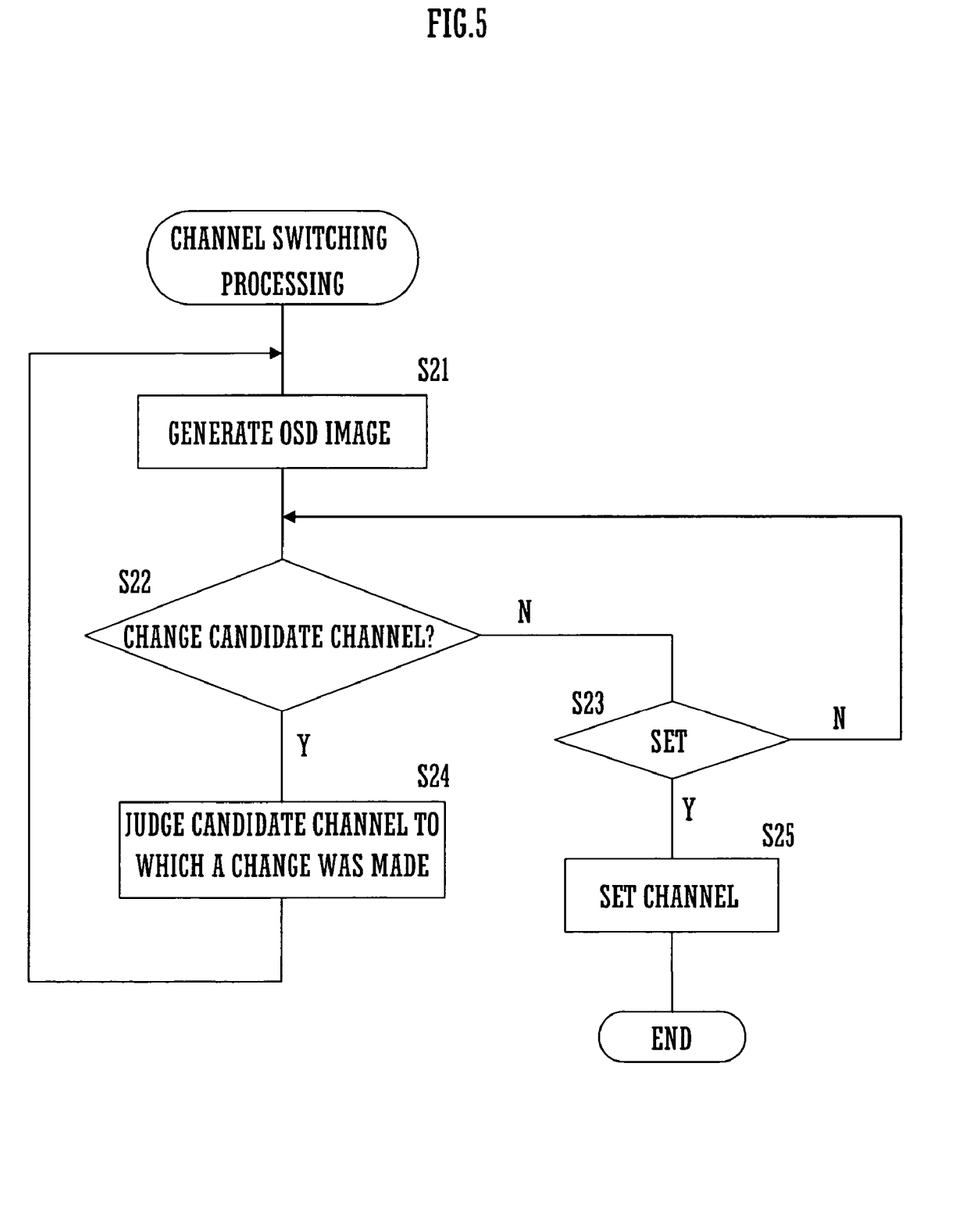
FIG. 5 is a flowchart that shows channel switching processing in a receiving apparatus that is an embodiment of this invention.
Figure 6:
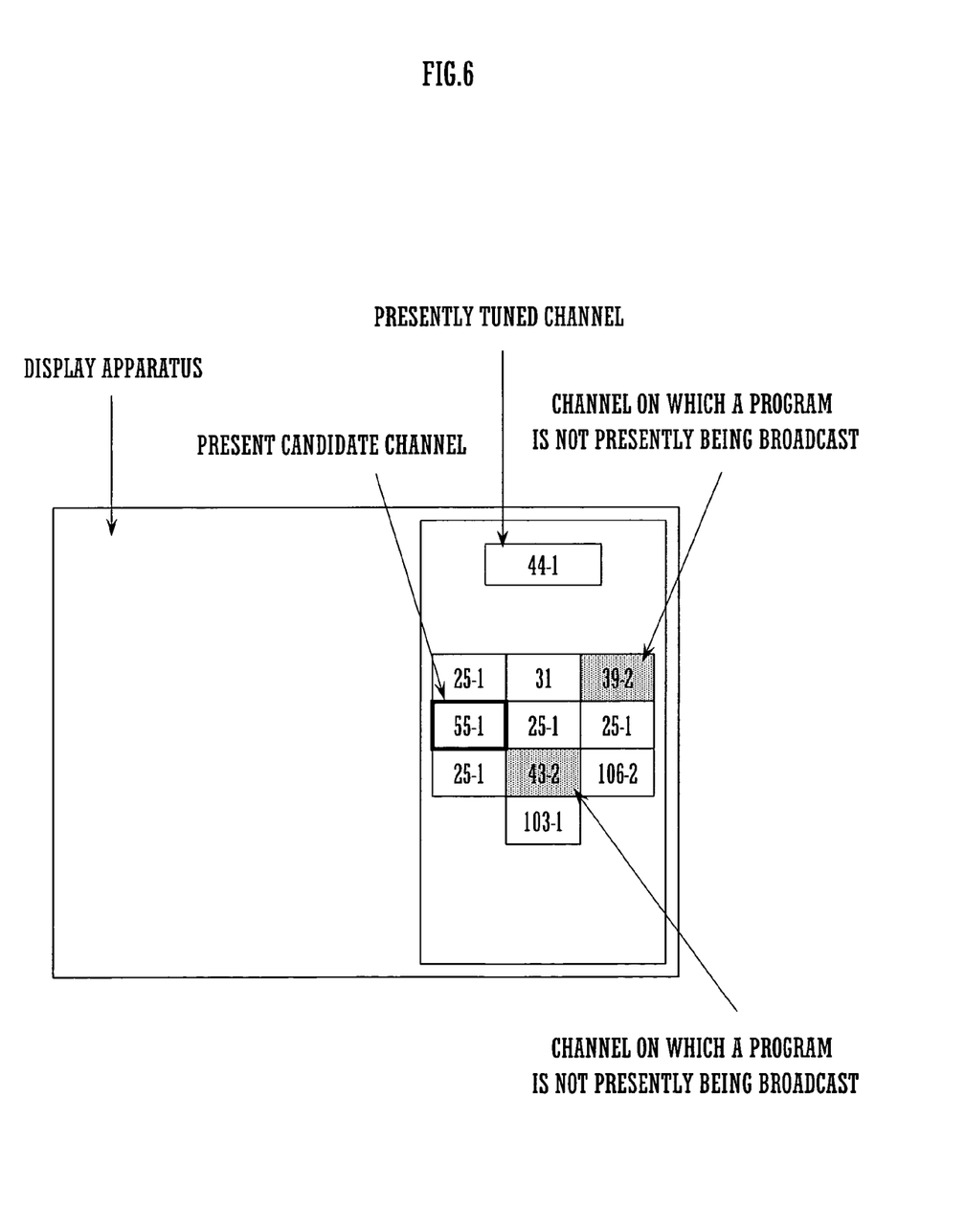
FIG. 6 shows an OSD image generated during the channel switching processing in a receiving apparatus that is an embodiment of this invention.

Following is a description of the channel switching processing using the favorite channel table 9B in the receiving apparatus 1. The receiving apparatus 1, in the OSD image generating portion 5, from the channels that are registered in the favorite channel table 9B, generates an OSD image that assists an operation that tunes the channel to which the channel is changed (S21). In S21, the OSD image generating portion 5 creates an OSD image in which channels whose broadcast suspension flag is turned on and channels whose broadcast suspension flag is turned off in the favorite channel table 9B are distinguished. The receiving apparatus 1, from the output portion 7, outputs a video signal of a composite image in which the OSD image generated by the OSD image generating portion 5 in S21 is superimposed on the video of the program being broadcast on the channel that is presently tuned (the channel before being switched). In the display apparatus 11, to which this video signal is being input, for example, the video shown in FIG. 6 is displayed. In FIG. 6, the video of the program being broadcast on the channel that is presently tuned is not shown. In FIG. 6, the channel independently displayed above the screen is the channel that is presently tuned. Also, a plurality of channels displayed segregated below the presently tuned channel are channels that are registered in the favorite channel table 9B, and the shaded channels are channels whose broadcast suspension flag is turned on. Further, the channel with a frame is the channel selected as a candidate to be switched to at this point in time (below, referred to as the candidate channel).

Accordingly, by performing an input operation for a channel switching request using the favorite channel table 9B, the user can check the channels that are registered in the favorite channel table 9B at that point in time, and can check whether or not a program is presently being broadcast for each channel.

The receiving apparatus 1 waits for change of the candidate channel or input of a selection decision (S22, S23). The performs input to change the candidate channel by operating cursor keys of the operating portion 8 or a remote control apparatus. When there is input to change the candidate channel, the receiving apparatus 1 judges the changed candidate channel (S24). Specifically, if the key operated by the user is the right cursor key, in the OSD image generated in S21, the channel displayed adjacently to the right of the presently selected candidate channel is provisionally set as the candidate channel. If the broadcast suspension flag associated with the candidate channel provisionally set here is turned on, the receiving apparatus 1 updates the candidate channel to be changed from this provisionally set channel to the channel displayed further adjacently to the right. The receiving apparatus 1 repeats this processing until a channel whose associated broadcast suspension flag is turned off is provisionally set as the candidate channel. If a channel whose associated broadcast suspension flag is turned off is provisionally set as the candidate channel, an OSD image in which the position of the frame has been changed according to the candidate channel provisionally set here is generated with the OSD image generating portion 5.

The candidate channel updated next after the channel at the right end is the channel displayed at the left end of one row below in the OSD image. Also, candidate channel updated next after the channel at the right end of the bottommost row is the channel displayed at the left end of the uppermost row in the OSD image. Also, when the left cursor key, up cursor key, or down cursor key has been operated, only the movement direction (movement direction in the OSD image) of the candidate channel to be updated relative to the candidate channel at that point in time differs, and so a description thereof is omitted here.

Also, when the receiving apparatus 1 judges in S23 that there was input of a selection decision, the candidate channel provisionally set at that point in time is set to the channel to be tuned (S25), and the receiving apparatus 1 ends main processing. When the receiving apparatus 1 completes channel switching processing using the favorite channel table 9B in FIG. 5, the receiving apparatus 1 returns to S3 and repeats the processing described above.

In this manner, in the channel switching using the favorite channel table 9B, the receiving apparatus 1 in this embodiment does not provisionally set the candidate channel to a channel whose associated program suspension flag is turned on, i.e., a channel on which a program is not being broadcast, in the channel. Accordingly, the user cannot tune a channel on which a program is not being broadcast, even if that channel is registered in the favorite channel table 9B. That is, a channel on which a program is not being broadcast is not tuned.

Figure 7:
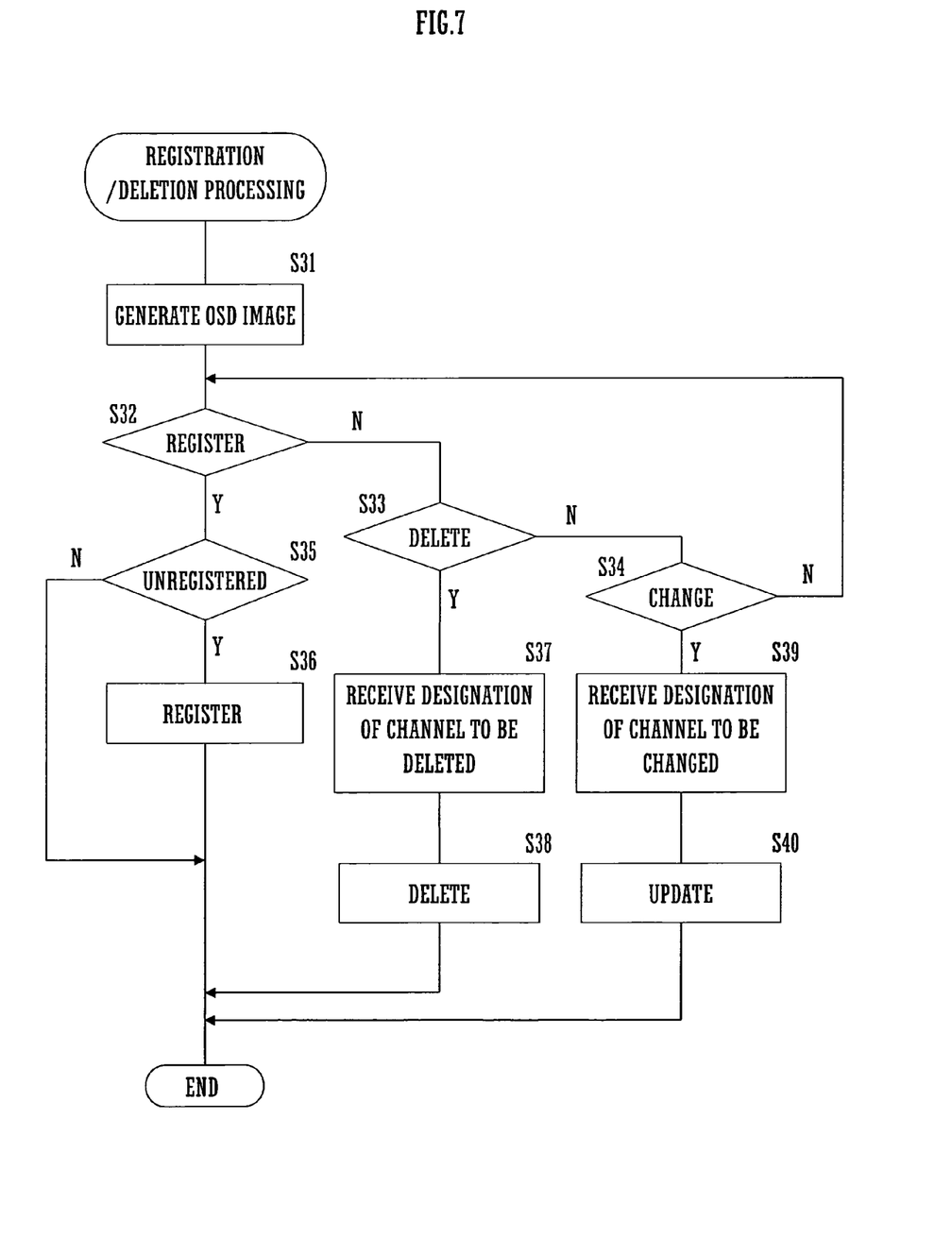
FIG. 7 is a flowchart that shows registration/deletion processing in a receiving apparatus that is an embodiment of this invention.
Figure 8:
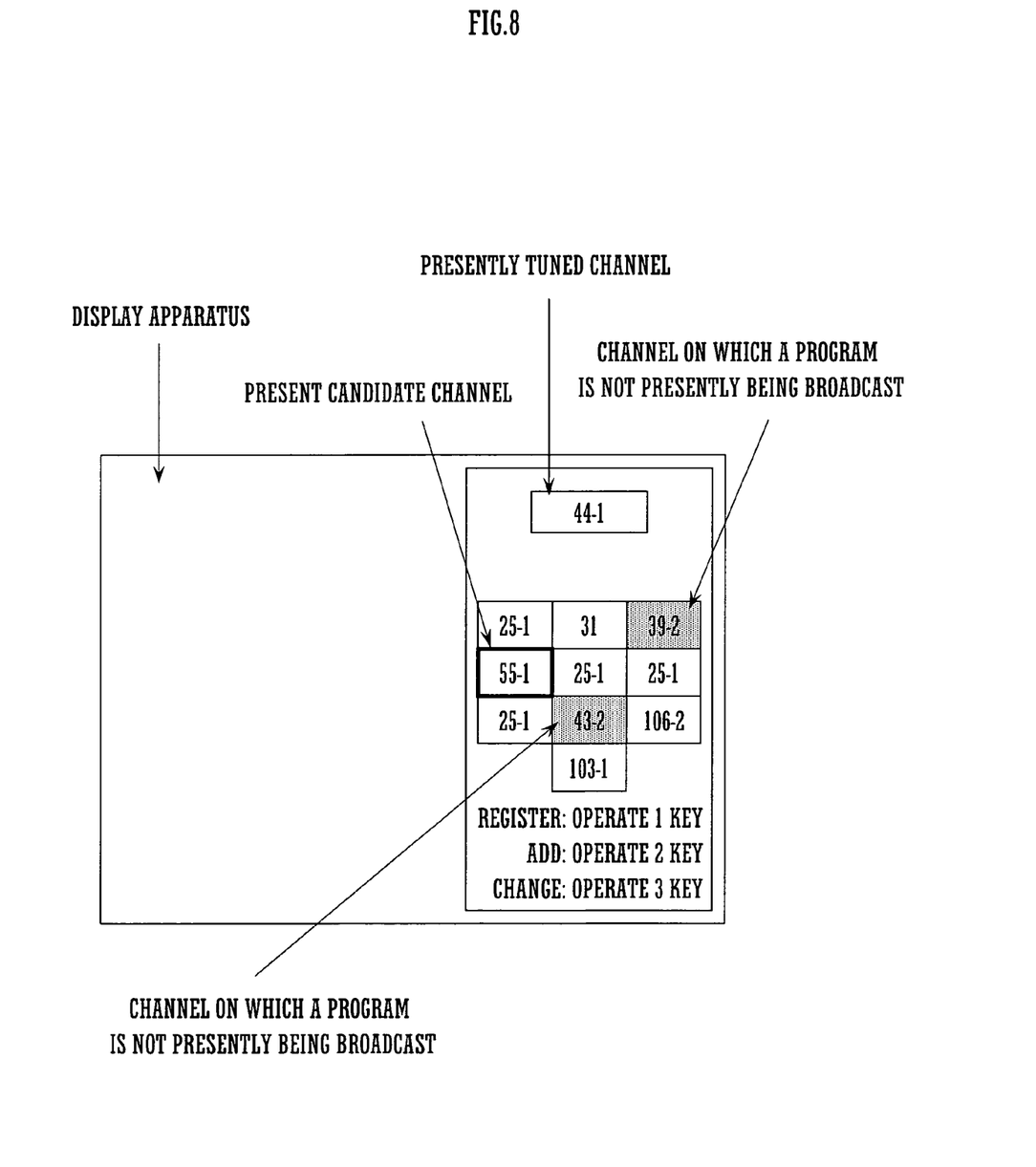
FIG. 8 shows an OSD image generated when performing registration/deletion processing in a receiving apparatus that is an embodiment of this invention.

When the receiving apparatus 1 judges in S7 that the current input is a request for processing to register/delete a channel to/from the favorite channel table 9B, the receiving apparatus 1 executes the registration/deletion processing shown in FIG. 7 (S9). The receiving apparatus 1 generates an OSD image with the OSD image generating portion 5 that assists registration of channels to or deletion of channels from the favorite channel table 9B (S31). The OSD image generated in S31 is approximately the same as the OSD image shown in FIG. 6. In S31, same as in S21, the an OSD image is created in which channels whose broadcast suspension flag is turned on and channels whose broadcast suspension flag is turned off at the present time are distinguished. The receiving apparatus 1, from the output portion 7, outputs a video signal of a composite image in which the OSD image generated by the OSD image generating portion 5 in S31 is superimposed on the video of the program being broadcast on the channel that is presently tuned. In the display apparatus 11, for example, the video shown in FIG. 8 is displayed. In FIG. 8, the video of the program being broadcast on the channel that is presently tuned is not shown. Also, in FIG. 8 the channels shown shaded are the channels whose broadcast suspension flag is turned on. Accordingly, the user can confirm whether or not a program is presently being broadcast for each channel that is registered in the favorite channel table 9B by viewing this image.

The receiving apparatus 1 here waits for input for registration, deletion or change (S32 to S34). When the input to the main body is registration, the receiving apparatus 1 judges whether or not the channel tuned at this point in time is already registered in the favorite channel table 9B (S35), and if not yet registered, newly registers the presently selected channel in the favorite channel table 9B (S36). When the input to the main body is deletion, the receiving apparatus 1 receives designation of the channel to be deleted (S37), and deletes the channel that has been designated here from the favorite channel table 9B (S38). The user, same as registration of a channel in the channel switching processing using the favorite channel table 9B described above, selects the channel to be deleted by operating a cursor key. However, the receiving apparatus 1 receives selection of a channel to be deleted irrespective of the state of the broadcast suspension flag. That is, it is possible for the user to select a channel to be deleted from the favorite channel table 9B regardless of whether the broadcast suspension flag is turned on or turned off.

Further, when input to the main body is a change, the receiving apparatus 1 receives designation of the channel to be changed (a channel that is registered in the favorite channel table 9B) (S39), and updates the channel designated here to the channel that is tuned at this point in time (S40). In this case as well, same as registration of a channel in the channel switching processing using the favorite channel table 9B described above, the user selects the channel to be changed by operating a cursor key. In this manner, by performing the registration/deletion processing shown in FIG. 7, the receiving apparatus 1 of this embodiment can register a desired channel to the favorite channel table 9B.

Also, when the receiving apparatus 1 judges that the input to the apparatus main body is the channel switching processing using the favorite channel table 9B described above, or processing other than registration/deletion processing, the receiving apparatus 1 executes processing (that other processing) for that input (S10). In S10, for example, channel switching processing using the all-channel table 9A, or processing such as an all-channel search that detects channels on which a program is being broadcast for each receivable physical channel, is performed. By switching channels using the all-channel table 9A, a channel that is not registered in the favorite channel table 9B can be tuned. Also, the all-channel table 9A is updated in the all-channel search.

In this manner, when it has been detected that a program is not being broadcast on a channel that is registered in the favorite channel table 9B, the receiving apparatus 1 of this embodiment not only does not delete this channel from the favorite channel table 9B, it prohibits this channel from being tuned, so it is possible to prevent the user from erroneously thinking that a mistake was made in the operation registering that channel in the channel table and becoming confused.

Also, in the above embodiment, a configuration is adopted in which, in the channel switching processing using the favorite channel table 9B, a channel on which a program is not being broadcast is prohibited from being tuned, but a configuration may also be adopted in which when a channel on which a program is not being broadcast has been tuned, that fact is displayed with the OSD image. Specifically, the processing shown in FIG. 5 may be replaced by the processing shown in FIG. 9.

The configuration and that other processing is the same as in the receiving apparatus 1 in the above embodiment.

Following is a description of the channel switching processing using the favorite channel table 9B in the receiving apparatus 1 of this other embodiment. The receiving apparatus 1, same as the receiving apparatus 1 of the above embodiment, produces an OSD image that assists an operation that tunes the channel switched to in S21. In S21, as described above, the OSD image generating portion 5 creates an OSD image in which channels whose broadcast suspension flag is turned on and channels whose broadcast suspension flag is turned off in the favorite channel table 9B are distinguished. The receiving apparatus 1, from the output portion 7, outputs a video signal of a composite image in which the OSD image generated by the OSD image generating portion 5 in S21 is superimposed on the video of the program being broadcast on the channel that is presently tuned (the channel before being switched). In the display apparatus 11, to which this video signal is being input, for example, the video shown in FIG. 6 is displayed.

Accordingly, in the receiving apparatus 1 of this embodiment as well, by performing an input operation for a channel switching request using the favorite channel table 9B, the user can check the channels that are registered in the favorite channel table 9B at that point in time, and can check whether or not a program is presently being broadcast for each channel.

Figure 9:
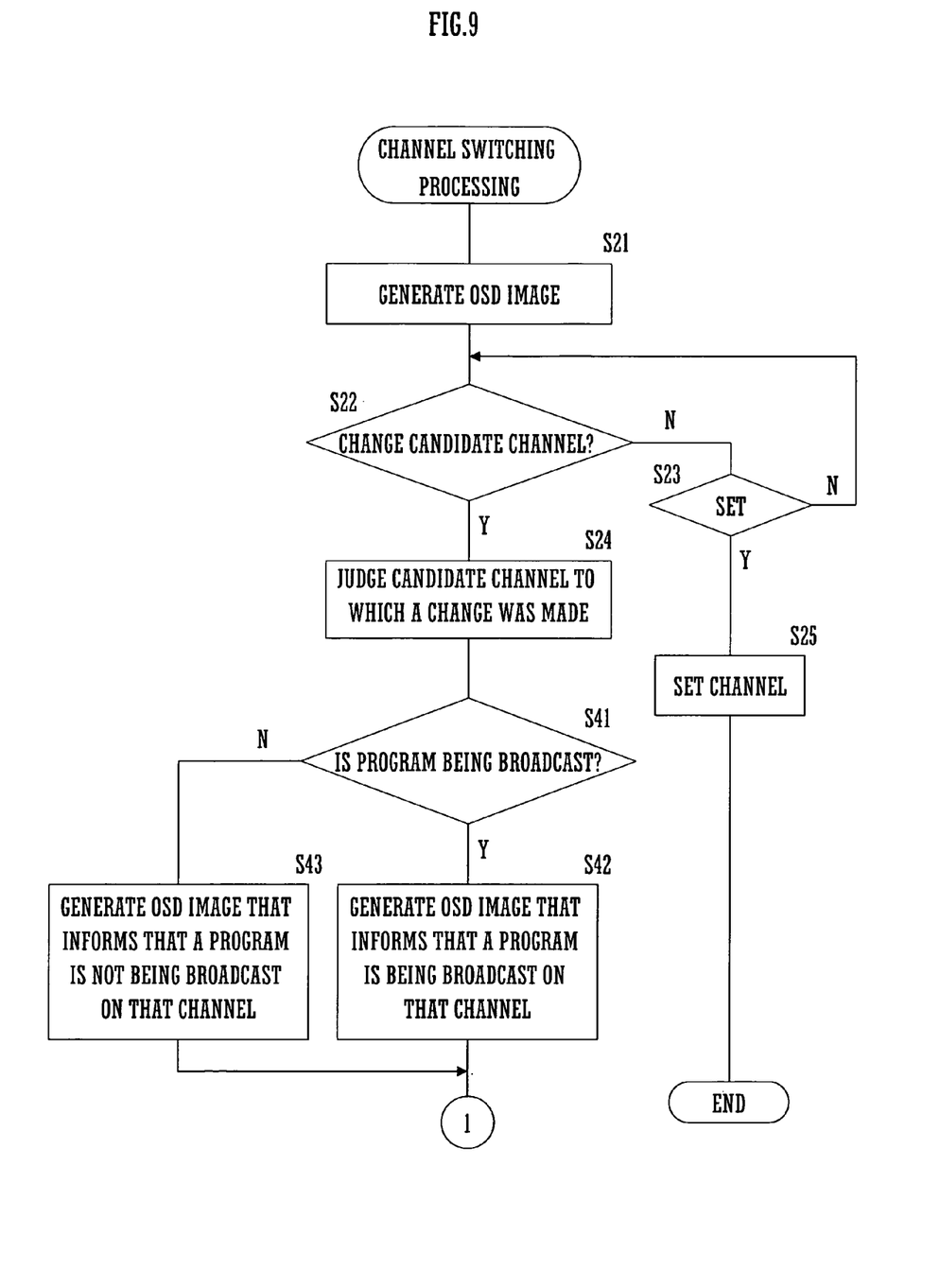
FIG. 9 is a flowchart that shows channel switching processing in a receiving apparatus that is another embodiment of this invention.
Figure 10A:
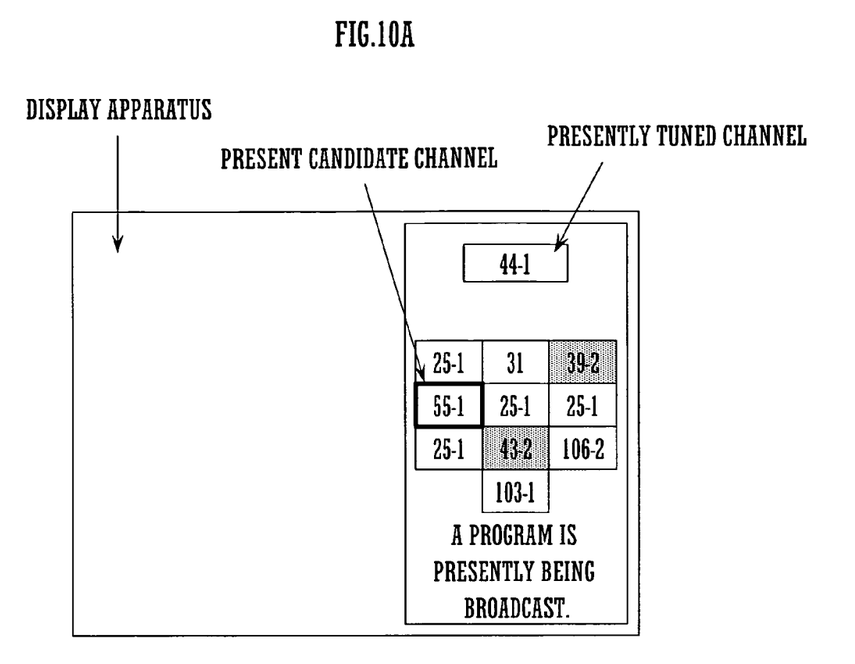
FIG. 10 shows an OSD image generated during the channel switching processing in the receiving apparatus that is an embodiment of this invention.
Figure 10B:
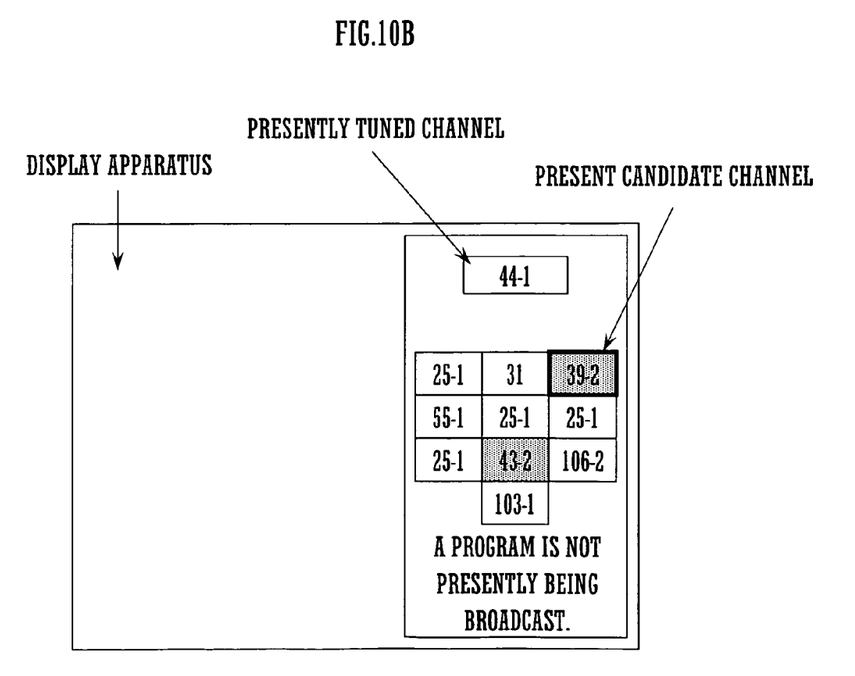

The receiving apparatus 1 waits for change of the candidate channel or input of a selection decision (S22, S23). The user performs input to change the candidate channel by operating cursor keys of the operating portion 8 or a remote control apparatus. When there is input to change the candidate channel, the receiving apparatus 1 judges the candidate channel to which a change was made (S24). In S24, specifically, if the key operated by the user is a right cursor key, in the OSD image generated in S21, the channel displayed adjacently to the right of the presently selected candidate channel is set to be the candidate channel. The receiving apparatus 1 judges whether the broadcast suspension flag associated with the set candidate channel is turned on or off (S41). When the receiving apparatus 1 judges in S41 that the associated broadcast suspension flag is turned off, it generates, in the OSD image generating portion 5, an OSD image (see FIG. 10) with the OSD image generating portion 5 in which the position of the frame has been changed according to the candidate channel set here (S42). On the other hand, when the receiving apparatus 1 judges that the associated broadcast suspension flag is turned on, it changes the position of the frame according to the candidate channel set here. Also, an OSD image in which a message informing that a program is not presently being broadcast on this candidate channel is displayed (see FIG. 10B) is generated with the OSD image generating portion 5 (S43). When the receiving apparatus 1 completes the processing in S42 or S43, it returns to S21.

Also, when the receiving apparatus 1 judges in S23 that there was selection decision input, it sets the candidate channel that was provisionally set at that point in time as the channel to be tuned (S25), and ends main processing. When the receiving apparatus 1 completes the channel switching processing using the favorite channel table 9B shown in FIG. 5, it returns to S3 and repeats the processing described above.

In this manner, in the channel switching using the favorite channel table 9B, when a channel whose associated broadcast suspension flag is turned on, i.e., a channel on which a program is not being broadcast, is provisionally set as the candidate channel, the receiving apparatus 1 in this embodiment displays a message informing that a program is not being broadcast in the OSD image. Accordingly, when the user has mistakenly tuned a channel on which a program is not being broadcast, even if the channel is registered in the favorite channel table 9B, it is possible to reliably inform the user of that fact, and same effect as in the above embodiment is attained.

Finally, the embodiments described above are to be considered in all respects as illustrative and not limiting. The scope of the invention is indicated by the appended claims rather than by the foregoing embodiments. Furthermore, all changes which come within the meaning and range of equivalency of the claims are intended to be embraced in the scope of the invention.

What is claimed is:

1. A receiving apparatus comprising:
   a registering means that registers a channel for which registration has been designated in a channel table;
   a tuning receiving means that receives tuning of only a channel that is registered in the channel table;
   a receiving means that receives a digital broadcast signal of the channel received by the tuning receiving means;
   a detecting means that detects whether or not a program is being broadcast for each channel;
   a broadcast suspension setting means that, when a channel for which it has been detected by the detecting means that a program is not being broadcast is a channel that is registered in the channel table, turns on a flag that indicates broadcast suspension and that is associated with the channel;
   a tuning reception prohibiting means that, for a channel that is registered in the channel table and for which the associated flag that indicates broadcast suspension is turned on, prohibits reception of tuning by the tuning receiving means; and
   a broadcast suspension releasing means that, when the detecting means has detected that a program is being broadcast on a channel that is registered in the channel table and whose associated flag indicating broadcast suspension is turned on, turns off the flag indicating broadcast suspension associated with that channel.

2. The receiving apparatus according to claim 1, wherein the detecting means, at a time that has been set in advance, detects whether or not a program is being broadcast for each channel that is registered in the channel table.

3. A receiving apparatus comprising:
   a registering means that registers a channel for which registration has been designated in a channel table;
   a tuning receiving means that receives tuning of only a channel that is registered in the channel table;
   a receiving means that receives a digital broadcast signal of the channel received by the tuning receiving means;
   a detecting means that detects whether or not a program is being broadcast for each channel;
   a broadcast suspension setting means that, when a channel for which it has been detected by the detecting means that a program is not being broadcast is a channel that is registered in the channel table, turns on a flag that indicates broadcast suspension and that is associated with the channel;
   an OSD image outputting means that outputs an OSD image that, when the channel received by the tuning receiving means is registered in the channel table and is a channel whose associated flag indicating broadcast suspension is turned on, informs that a program is not presently being broadcast; and
   a broadcast suspension releasing means that, when the detecting means has detected that a program is being broadcast on a channel that is registered in the channel table and whose associated flag indicating broadcast suspension is turned on, turns off the flag indicating broadcast suspension associated with that channel.

4. The receiving apparatus according to claim 3, wherein the detecting means, at a time that has been set in advance, detects whether or not a program is being broadcast for each channel that is registered in the channel table.

* * * * *